Patented Aug. 1, 1939

2,167,784

UNITED STATES PATENT OFFICE

2,167,784

METHOD OF TREATING IRON FLUORIDE

Svend S. Svendsen, Madison, Wis., assignor, by mesne assignments, to The Sherwin-Williams Company, Cleveland, Ohio, a corporation of Ohio No Drawing. Application January 13, 1936, Serial No. 58,895

10 Claims. (Cl. 134—59)

This invention relates to a method for treating iron fluoride, especially the double fluoride of iron and ammonium, for the recovery of the fluoride contained therein and for the production of iron oxide. This application is a continuation in part of my copending applications Serial Nos. 614,043 filed May 27, 1932 (now Patent No. 2,042,434, granted May 26, 1936) and 745,753 filed September 27, 1934 (now Patent No. 2,042,435, granted May 26, 1936).

When titanium-bearing ores, especially the oxide ores such as ilmenite and rutile, are treated, as described in the above applications, with reactive fluorides, such as ammonium fluoride or ammonium bifluoride, iron fluoride is formed with the iron contained in said ore. The titanium fluoride compound formed may be removed by leaching the reaction mass resulting from the reaction between the ore and the ammonium fluoride with water or by a volatilization process. If the reaction mass is not heated high enough to volatilize the titanium fluoride compound therefrom and is leached with water to dissolve the titanium fluoride compound the residual iron fluoride, being substantially insoluble in water, is thereby separated from the titanium compound. The residual iron fluoride is a double fluoride of iron and ammonium.

If the reaction mass resulting from the heating of a mixture of ammonium fluoride and titanium-bearing ore is heated hot enough to remove the titanium fluoride compound as a volatile salt the residual iron fluoride may be the single salt which does not contain ammonium fluoride in combination as the double salt.

It is desirable commercially to recover the fluorine from the iron fluoride formed by the initial reaction. I have found also that if the iron fluoride is treated in accordance with certain of the methods described herein an iron oxide is formed which has properties that make it desirable as a paint pigment. When iron fluoride and particularly ferrous fluoride is heated at a temperature above 300 to 400 degrees centigrade in the presence of steam it is reacted upon with the formation of iron oxide and hydrofluoric acid. This hydrofluoric acid may then be treated with ammonia, which may be taken from the vapors driven off during the initial ore decomposition reaction, to again form ammonium fluoride which may be used to react with further quantities of the titanium-bearing ore. If air is not present during the reaction of the steam with the iron fluoride a black pigment is formed. If air is present, however, various shades of red iron oxide are formed depending upon the temperatures and relative amounts of steam and air which are used.

In a specific example the titanium-bearing ore such as ilmenite is finely ground and is digested with a concentrated solution of ammonium fluoride or bifluoride in large excess, the digestion continuing until the temperature reaches 150° to 180° C., or until most of the water is driven from the reaction mass. The large excess (usually 50% or more than the stoichiometric amount) of the ammonium fluoride which is used to secure complete conversion of the ilmenite into fluorides also has the advantage of adding the desired excess of ammonium fluoride and ammonium bifluoride, or either of them, to the resulting titanium fluoride. The titanium fluorides so produced apparently are tetrafluorides. The residue, a grayish paste or powder, is either lixiviated with water and filtered, or it is heated to above 300 degrees C. If the lixiviation process is used the titanium salts are dissolved and a double fluoride of iron and ammonia remain, these being practically insoluble in water. If the reaction mass is heated to above 300 degrees C. the excess ammonium fluoride and titanium fluoride salts are volatilized from the reaction mass, leaving the iron fluoride and other non-volatile fluorides, such as calcium and aluminum, as a residue.

The iron double fluoride residue from the leaching operation is heated in the presence of steam in a closed furnace to 400°–600° C. The volatilized ammonium bifluoride formed is condensed, and the residual iron oxide which is formed may be used for pigment or abrasive purposes. This makes a black pigment. If a red pigment is desired, the double fluoride is first decomposed at 400–450° C. whereby the ammonium fluoride is volatilized, leaving the ferrous fluoride, which is then treated at 500° to 600° C. with moist air. These two steps may be carried out simultaneously.

In the method where the titanium fluoride compounds are volatilized the reaction residue, which may contain other metallic fluorides such as aluminum and calcium in addition to the iron fluoride, may be heated in an atmosphere of water vapor and ammonia, or water vapor alone. Air may also be present with the water vapor in order to form the red oxide as previously described. In both methods the final reaction is between the iron fluoride and the water vapor or the combination of water vapor and air. Iron oxide is formed in both cases, and hydrofluoric acid in the form of a volatile gas is formed unless ammonia also is present. The hydrofluoric acid may be subsequently combined with ammonia to re-form ammonium fluoride which may be used for treating further quantities of the ilmenite ore.

The iron fluoride residue from either the leaching or volatilization process of treating the digested ore also may be treated with ammonium sulfate at a temperature of 300° to 350° C. whereby the reaction results in the formation of ammonium fluoride and iron sulfate. Other fluorides present likewise may be decomposed. The ammonium fluoride is volatilized from the reaction mass. The iron sulfate may be heated to a red heat whereby iron oxide and sulfur trioxide are formed. The sulfur trioxide may then be reacted with ammonia formed and volatilized during the initial ore-decomposition reaction to thereby form ammonium sulfate which may be used to decompose further quantities of iron fluoride. The reaction therefore is cyclic.

The iron oxide formed by the decomposition of the iron fluoride in the presence of steam alone or steam and air may contain a small amount of residual combined fluorine either due to incomplete reaction or to the presence of fluorides such as calcium fluoride which are not decomposed by this treatment. Such small amounts of residual fluorides, which have considerable chemical stability, do not seem to affect the quality of the iron oxide when used in paints. On the other hand such residual fluorides seem to have some beneficial effect as a preservative against mold and the like if the paint produced therefrom is used in moist locations. The residual combined fluorine usually is present in an amount less than 5 per cent (5%).

In this application I make no distinction between ammonium fluoride and ammonium bifluoride in their chemical reaction with the titanium-bearing ore. However, physically the two compounds differ, the bifluoride melting and causing furnace difficulties not encountered with the normal salt. In the initial reaction ammonia is formed and ammonium fluoride is consumed. It is understood that the process is cyclic with reference to these two materials, that is, when they are produced as a result of the reaction they are recovered and used again in the process.

I claim:

1. In a method of preparing an iron oxide material by treatment of the residual material comprising iron fluoride which is formed by the separation of a titanium fluoride compound from a mixture of titanium fluoride and iron fluoride compounds formed by the heating of a titanium-bearing material containing iron with ammonium fluoride to a temperature high enough to cause a reaction to form said mixture of fluoride compounds of titanium and iron, the step which comprises treating said separated iron-fluoride-containing material with a hydrogen and oxygen containing inorganic compound which forms with said iron fluoride at temperatures from 300 to 600° C. an oxygen compound of iron and a volatile fluoride, said treatment being carried out at a temperature high enough to effect said reaction.

2. In a method of preparing an iron oxide material by treatment of the residual material comprising iron fluoride which is formed by the separation of a titanium fluoride compound from a mixture of titanium fluoride and iron fluoride compounds formed by the heating of a titanium-bearing material containing iron with ammonium fluoride to a temperature high enough to cause a reaction to form said mixture of fluoride compounds of titanium and iron, the step which comprises heating said separated iron-fluoride-containing material and treating said heated material with steam while at an elevated temperature, said temperature being sufficiently high to cause the oxygen of said steam to combine with the iron of said iron fluoride and the hydrogen of said steam to combine with the fluorine of said iron fluoride to form hydrogen fluoride.

3. In a method of preparing an iron oxide material by treatment of the residual material comprising iron fluoride which is formed by the separation of a titanium fluoride compound from a mixture of titanium fluoride and iron fluoride compounds formed by the heating of titanium-bearing material containing iron with ammonium fluoride to a temperature high enough to cause a reaction to form said mixture of fluoride compounds of titanium and iron, the step which comprises heating said separated iron-fluoride-containing material and treating said heated material with steam and air while at an elevated temperature, said temperature being sufficiently high to cause the oxygen of said steam to combine with the iron of said iron fluoride and the hydrogen of said steam to combine with the fluorine of said iron fluoride.

4. In a method of preparing an iron oxide material by treatment of the residual material comprising iron fluoride which is formed by the separation of a titanium fluoride compound from a mixture of titanium fluoride and iron fluoride compounds formed by the heating of a titanium-bearing material containing iron with ammonium fluoride to a temperature high enough to cause a reaction to form said mixture of fluoride compounds of titanium and iron, the step which comprises heating said separated iron-fluoride-containing material to 400° to 600° C. and treating said heated material with steam while at said temperature.

5. In a method of preparing an iron oxide material by treatment of the residual material comprising iron fluoride which is formed by the separation of a titanium fluoride compound from a mixture of titanium fluoride and iron fluoride compounds formed by the heating of a titanium-oxide ore containing iron with ammonium fluoride to a temperature high enough to cause a reaction to form said mixture of fluoride compounds of titanium and iron, the step which comprises heating said separated iron-fluoride-containing material and treating said heated material with steam and air while at an elevated temperature, said temperature being sufficiently high and the ratio of steam and air being such that the oxygen of said steam combines with the iron of said iron fluoride to form a reddish iron oxide and the hydrogen of said steam combines with the fluorine of said iron fluoride to form hydrogen fluoride.

6. In a method of preparing an iron oxide material by treatment of the residual material comprising iron fluoride which is formed by the separation of a titanium fluoride compound from a mixture of titanium fluoride and iron fluoride compounds formed by the heating of a titanium-bearing material containing iron with ammonium fluoride to a temperature high enough to cause a reaction to form said mixture of fluoride compounds of titanium and iron, the steps which comprise heating said residual material at a temperature sufficient to volatilize ammonium fluoride combined with the iron fluoride as a double fluoride salt of iron and treating said heated remaining material with steam while at an elevated temperature, said temperature being sufficiently high to cause the oxygen of said steam to combine with the iron of said fluoride to form iron oxide and the hydrogen of said steam to combine with the fluorine of said iron fluoride to form hydrogen fluoride.

7. In a method of preparing an iron oxide material by treatment of the residual material comprising iron fluoride which is formed by the separation of a titanium fluoride compound formed from a mixture of titanium fluoride and iron fluoride compounds formed by the heating of a titanium-bearing material containing iron with ammonium fluoride to a temperature high enough to cause a reaction to form said mixture of fluoride compounds of titanium and iron, the step which comprises treating said separated iron-fluoride-containing material with steam and air while at a temperature of 400° to 600° C.

8. In a method of preparing an iron oxide material by the treatment of iron-containing-materials with a reactive fluoride whereby iron fluoride is formed, the steps which comprise heating said iron fluoride and treating said heated material with steam while at an elevated temperature, said temperature being sufficiently high to cause the oxygen of said steam to combine with the iron of said iron fluoride and the hydrogen of said steam to combine with the fluorine of said iron fluoride.

9. In a method of preparing an iron oxide material by the treatment of iron-containing materials with a reactive fluoride whereby iron fluoride is formed, the steps which comprise heating said iron fluoride and treating said heated fluoride with steam and air while at an elevated temperature, said temperature being sufficiently high and the proportions of steam and air being such as to cause the oxygen of said steam to combine with the iron of said iron fluoride to form a reddish iron oxide and the hydrogen of said steam to combine with the fluorine of said iron fluoride to form hydrogen fluoride.

10. In a method of preparing an iron oxide material by treatment of the iron fluoride formed by the action of iron-containing materials with ammonium fluoride, the steps which comprise heating the iron fluoride formed thereby at a temperature sufficient to volatilize ammonium fluoride associated with said iron fluoride and treating said heated residual material with steam while at a temperature of 400° to 600° C.

SVEND S. SVENDSEN.